United States Patent Office 3,707,489
Patented Dec. 26, 1972

3,707,489
PROCESS OF PREPARING ETHYLIDENE COMPOUNDS
Gerhard Teichmuller, Kurt Barnikol-Oettler, and Werner Hartmann, Jena, Germany, assignors to VEB Jenapharm, Jena, Germany
No Drawing. Filed Jan. 19, 1971, Ser. No. 107,847
Int. Cl. C07c 167/20
U.S. Cl. 260—397.5        11 Claims

ABSTRACT OF THE DISCLOSURE

Process of preparing ethylidene compounds with different fundamental or parent substances having the structural formula:

(II)

wherein $R_1$ and $R_2$ each represent a saturated or unsaturated aliphatic group which can be substituted by functional groups and wherein $R_1$ and $R_2$ taken together can form an alicyclic group such as cyclopentyl, cyclohexyl and the like, or $R_1$ and $R_2$ can be joined together to form a condensed hydroaromatic group such as a perhydroindane, cyclopentano-perhydronaphthaline or cyclopentano-perhydrophenanthrene group, whereby the C—C bounds of the parent substance are preferably unsaturated and in steroid compounds the ring of the basic structure can be joined in either the cis- or transform which comprises reacting an easily hydrolyzable derivative of vinyl and ethinyl carbinol, as for instance an ether, having the formula:

(I)

wherein $R_1$ and $R_2$ are as above defined and $R_3$ is vinyl or ethinyl and $R_4$ is a trialkylsilyl or tetrahydropyranyl group with an alkali metal in the presence of a proton donor and liquid ammonia.

These compounds are particularly adapted for use as intermediates for use in preparing highly active steroid compounds, as for example, 19-nor pregnane derivatives.

—————

This invention relates to a novel process for preparing ethylidene compounds with different fundamental or parent substances.

More particularly this invention relates to a process of preparing ethylidene compounds having the structural formula:

(II)

wherein $R_1$ and $R_2$ each represent a saturated or unsaturated aliphatic group which can be substituted by functional groups and wherein $R_1$ and $R_2$ taken together can form an alicyclic group such as cyclopentyl, cyclohexyl and the like, or $R_1$ and $R_2$ can be joined together to form a condensed hydroaromatic group such as a perhydroindane, cyclopentano-perhydronaphthaline or cyclopentano-perhydrophenanthrene group, whereby C—C bonds of the parent substance are preferably unsaturated and in steroid compounds the ring of the basic structure can be joined in either the cis- or trans- form. Instances of preferred $R_1$ and $R_2$ groups are $R_1=CH_3$ and $$R_2=-CH_2-CH_3$$

It is known that ethylidene compounds can be prepared according to the Wittig reaction by reacting a large excess of an ethyltriphenyl-phosphoniumhalogenide with the corresponding ketone. This reaction produces in excellent yields, mixtures of cis-trans-ethylidene compounds in which the cis-compound constituted the main product. In order to separate the cis-trans mixtures into their components, however additional purifying operations are required.

Trans-ethylidene compounds have also been prepared in yields of about 70% from ethylcarbinols by subjecting the latter compounds to treatment with $POCl_3$ in the presence of pyridine at 135° C. resulting in a splitting off of water from the ethylcarbinol.

Methods are also known in which vinyl- or ethinyl-carbonols are converted into the corresponding ethylidene compounds by means of a Birch reduction reaction. A. J. Birch has, by utilizing this type of reaction, recovered from ethinylcyclohexanol a mixture of ethylidene cyclohexane along with the starting material. When these same reaction conditions are used with mestranol, there is formed a mixture of 40% 17α-vinyl-3-methoxy-estra-2,5(10) diene-17β-ol, 26% 3 - methoxy - 19 - nor - pregnane-2,5(10)-17(20)-triene and 16.7% 3-methoxy-19-nor-pregnane-1,3,5(10),17(20)-tetraene.

The Birch reaction has heretofore only been used with compounds containing the ethinyl carbinol system or with such compounds additionally containing an aromatic group in their molecule and with these compounds, it has not been possible to obtain complete reaction of the starting ethinyl carbinol and even then only mixtures of different reaction products have resulted. Development of this reaction or of the other known reactions has not yet provided an economically satisfactory method of preparing the desired ethylidene compounds.

It is an object of this invention to provide a process for preparing ethylidene compounds suitable for use as synthesis intermediate products and which in particular can be used for manufacturing highly active steroids, such as, for example, 19-nor-pregnane derivatives.

Another object of this invention is to provide a process for reducing ethinyl carbinol derivatives which can be carried out with technically simple operational steps and with the preservation of the existing aromatic systems.

Still another object of the invention is to provide a process for obtaining trans-ethylidene compounds in good yields.

These and other objects and advantages of the invention will become apparent from a consideration of the following disclosure.

In accordance with the invention, easily hydrolyzable derivatives of vinyl- and ethinyl-carbinols, such as for instance, ethers, as for example, vinyl- and ethinyl-carbonol-trialkyl-silylethers or tetrahydropyranyl ethers having the formula

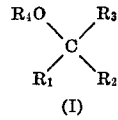
(I)

wherein $R_1$ and $R_2$ each represent a saturated or unsaturated aliphatic group, which can be substituted by additional functional groups and where $R_1$ and $R_2$ can be joined together to form an alicyclic group such as cyclopentyl or cyclohexyl or $R_1$ and $R_2$ can be joined together to form a condensed hydroaromatic group of the perhydroindane, cyclopentanoperhydronaphthaline or cyclopentanoperhydro-phenanthrene type, the C—C bonds of the parent compound preferably being unsaturated and in steroid compounds the ring of the basic structure can be joined in either the cis- or transform, $R_3$ is vinyl or ethinyl and $R_4$ is a trialkylsilyl or tetrahydropyranyl group are reacted with an alkali metal in the presence of a proton donor and liquid ammonia to form ethylidene compounds of the formula

(II)

wherein $R_1$ and $R_2$ are as above defined.

This result is to be considered most surprising in that according to the known methods, on the basis of the Birch reduction of vinyl- and ethinyl-carbinols, only mixtures of reduction reaction products have been obtained.

In accordance with the process of the invention for reducing the easily hydrolyzable derivatives of vinyl- and ethinyl-carbinol, there can be used in the Birch reduction reaction, any of the conventional reducing agents, solvents, proton donors and either liquid ammonia or an amine such as methylamine, ethylamine and ethylenediamine. As reducing agent, there is preferably used in the process an alkali or alkaline earth metal, such as sodium or potassium. As solvent there is preferably used any of those solvents which are stable under the reduction conditions and preferably a cyclic or straight chain ether such as tetrahydrofuran, dioxan, glycol ether, or a dialkylether such as diethyleter. As proton donor there can be used compounds which in the amono-system have a pKa value L30, such as for example, aniline, diphenylaniline, diphenylamine alcohols such as ethanol, isopropanol, tertiary butanol, and methanol acetamide, and the like.

In accordance with the invention, a solution of the trialkylsilylether or tetrahydropyranylether of the vinyl- or ethinyl carbinol compound is advantageously with or without addition of the proton donor introduced slowly, under stirring, to a reduction mixture of liquid ammonia or amine and an alkali metal whereby the reduction mixture can also contain the proton donor. During the reaction, there can be advantageously introduced further amounts of the alkali metal up until the calculated amount, the additions being made in small increments so that the reaction solution takes on a dark blue color.

The reaction can also be carried out by mixing the liquid ammonia, ether derivative and proton donor together and then introducing the required amount of alkali metal. In carrying out the reaction, it is also possible for the liquid ammonia, ether derivative and alkali metal to be mixed together and for the proton donor to be added to this mixture. The last two mentioned variations give equally satisfactory results to that of the first mentioned procedure.

In either of the procedural variations, the reaction mixture following the addition of the necessary amount of alkali metal is completely reduced. After the reduction, the reaction solution is decolorized and the excess alkali metal destroyed by addition of ammonium chloride or another suitable election consuming agent. The ammonia is evaporated off, the solvent distilled off under vacuum and the distillation residue, under stirring, through the slow addition of water and advantageously through addition of dilute acid brought to crystallization. Any non-crystallizable compounds present are extracted and thereafter recovered by fractional procedures.

In accordance with the process of the invention, all vinyl- and ethinyl-carbinols in the form of their easily hydrolyzable trialkylsilyl ethers or tetrahydropyranylethers can be converted into their corresponding ethylidene compounds. If the vinyl- or ethinyl-carbinol ethers contain other reducible groups in their molecules, such as carbonyl groups, conjugated double bonds, aromatic groups and the like, an especial advantage of the process of the invention is realized, in that through selection of suitable proton donors, it is also possible to convert these compounds into the desired ethylidene compounds. On the one hand, through the use of strong proton donors having a pKa value <23 there can simultaneously be reduced all of the reducible groups present in the molecule, or if desired or necessary, the reductions can be carried out in sequence one after the other by successive addition of different proton donors.

Thus, there can in accordance with the invention through varying the proton donor, i.e. by utilizing proton donors of different strengths, be carried out the following sequence of reactions: reduction of 17α-ethinyl-3-methoxy - 17β - trimethylsilyl - oxy-estra-1,3,5(10),8-tetraene with aniline to form 3-methoxy-19-nor-pregnane-1,3,5(10),17(20)-tetraene, reduction of the latter with alcohol to form 3-methoxy-19-nor-pregnane-2,5(10),17 (20)-triene, and by reduction of the latter with aniline and alcohol or acetamide over the 3-methoxy-19-nor-pregnane-1,3,5(10),17(20)-tetraene to form 3-methoxy-19-nor-pregnane-2,5(10),17(20)-triene, without isolation of the intermediate products.

In the case of compounds which do not contain further reducible groups, such as for instance, ethinylcyclohexanolsilylethers, all of the known proton donors can be used. Aniline is preferred and brings about a substantially complete conversion to the desired ethylidene compound. Hydroxyl groups which were present in the molecule and which have been converted into silylethers in the starting materials are in the reduction, under use of the proton donors and alkali metals, restored.

It has been found in accordance with the invention, that in order to completely reduce the ethinyl carbinol ethers to the ethylidene compounds, 4 mols alkali metal/mol ethinyl carbinol ether compound are required. This corresponds to the stoichiometrically necessary amount. Preferably, the reaction is conducted with an excess of 0.1 mol of alkali metal. For reducing a mol of ethinyl carbinol ether which contains in addition to an aromatic system a conjugated double bond 6 mol alkali metal/mol of starting material are needed, which corresponds to the stoichiometrically necessary amount. This low consumption of alkali metal and the possibility of selective reduction together with the substantially complete conversion are advantages of the process of the invention not possessed by the known methods in which free ethinyl carbinols are reduced.

Further advantages of the process of the invention are that the reaction can be carried out simply, with readily available materials, under technically desirable conditions, for preparing ethylidene compounds, in particular trans-17-ethylidene steroids, as uniform products in high yields.

The process of the invention has considerable importance in steroid chemistry in that the high selectivity of the reduction reaction makes it possible to prepare stable 19-nor-1,3,5(10)-pregna-triene derivatives for example from 17α - ethinyl - 17β-trimethylsilyloxy-1,3,5(10)-estratriene derivatives under maintenance of the aromatic system.

The invention is further illustrated by the following examples, which are in no way however to be construed as limiting the scope thereof.

EXAMPLE 1 d-3-methoxy-19-nor-pregnane-1,3,5(10)17(20)-tetraene 15 g. d-17α-ethinyl-3-methoxy - 17β - trimethylsilyloxy-1,3,5(10)-estratriene were dissolved in tetrahydrofuran and this solution introduced under stirring into a mixture of 105 ml. liquid ammonia, tetrahydrofuran and aniline. Before and during the addition of the steroid solution, a total of 3.7 g. sodium in small portions were introduced into the reaction solution, resulting in the formation of a dark blue colored solution. Following the addition of the steroid solution and of the sodium, the reaction mixture was allowed to stand for some time to ensure complete reduction and the reaction solution was then decolorized by the addition of a small amount of $NH_4Cl$. Thereafter the ammonia was evaporated off, the tetrahydrofuran greatly concentrated in vacuo and the residue brought to crystallization by addition of water and dilute acid. The crystalline product was recovered by suction, washed with water until acid free and dried.

Yield: 11.4 g.=98% of theory.

Following recrystallization out of hexane a product melting at 90–92° C. was recovered.

EXAMPLE 2 dl-3-methoxy-19-nor-pregnane-1,3,5(10)-tetraene

A solution of 5 g. dl-17α-ethinyl-3-methoxy-17β-trimethyl-silyloxy-1,3,5(10)-estratriene, 3.5 ml. aniline and tetrahydrofuran was introduced under stirring into 50 ml. liquid ammonia. 1.3 g. sodium in small portions were introduced into this solution and the resulting deep blue colored solution stirred for a further hour. The reaction solution was decolorized by addition of $NH_4Cl$, the ammonia and then the tetrahydrofuran there distilled off under vacuum. On addition of dilute acid (slowly) to the residue, the reaction product separated out in crystalline form. Following stirring for a short time, the crystals were separated off, washed with water until acid free and dried.

Yield: 3.54 g.=91% of theory.

EXAMPLE 3 dl-3-methoxy-19-nor-pregnane-1,3,5(10)17(20)-tetraene 5 g. dl-17α-ethinyl-3-methoxy-17β-trimethylsilyloxy-1,3,5(10)-estratriene were dissolved in 35 ml. tetrahydrofuran and reacted with aniline. This solution was within 30 minutes and under stirring introduced into a mixture of liquid ammonia, aniline and lithium. During the addition of the steroid solution, further lithium, in small portions for a total of 400 mg. was introduced. The further reaction and the working up were carried out as set out in Example 1.

Yield: 3.71 g.=95.5% of theory.

EXAMPLE 4 dl-3-methoxy-19-nor-pregnane-1,3,5(10)17(20)tetraene

The procedure as described in Example 3 was followed using potassium in place of lithium.

Yield: 3.76 g.=97% of theory.

EXAMPLE 5

Pregnane-5,17(20)-diene-3β-ol 1 ml. aniline was introduced into liquid ammonia and 200 mg. sodium then added under stirring. To this deep blue colored reaction solution, a solution of 2 g. 17α-ethinyl-3β,17β-bis-(trimethylsilyloxy)-5-androsterone and aniline in 50 ml. tetrahydrofuran were added. During the addition of the steroid solution, another 850 mg. sodium in small portions were introduced. After 2 hours, the excess of alkali metal was decomposed by addition of methanol and the ammonia distilled off. 25 ml. dilute hydrochloric acid were introduced into the resultant tetrahydrofuran solution and the mixture then distilled in vacuum until crystallization set in. Water was then added, the mixture stirred for a further 30 minutes and the crystals separated by suction, washed until acid free and dried.

Yield: 1.35 g.=98% of theory; M.P., 132–135° C.

By crystallizing out of acetone, a product melting at 135–137° C. was recovered.

EXAMPLE 6

3-methoxy-19-nor-pregnane-2,5(10)17(20)-triene 3 g. 17α-ethinyl-3-methoxy-17β-trimethylsilyloxy - 1,3,5 (10-estratriene were dissolved in 40 ml. tetrahydrofuran and reacted with aniline. The resultant solution was, under stirring, added to a mixture of 80 ml. $NH_3$, tetrahydrofuran and 1 ml. aniline. Prior to, and during the addition of the steroid solution, 750 mg. sodium were also introduced resulting in the formation of deep blue colored reaction solution. After the addition of the steroid solution had been completed, the reaction mixture was stirred for a further hour and then a further 600 mg. sodium were added. 2 ml. t-butanol mixed with tetrahydrofuran were then added within a 30-minute period in a dropwise fashion and the resultant reaction mixture stirred for a further hour. The small excess of sodium still present was decomposed by addition of methanol and the ammonia present distilled off. Water was then added and the tetrahydrofuran distilled off under vacuum. The remaining residue was reacted with water and stirred for about 30 minutes. The crystalline product which thereby formed was suctioned off, washed until alkali free and dried.

Yield: 1.95 g.=85% of theory; M.P., 105–110° C.

Following recrystallization out of ether the recovered product had a melting point of 109–114° C.

EXAMPLE 7

3-methoxy-19-nor-pregnane-2,5(10)17(20)-triene 3 g. 17α-ethinyl-3-methoxy-17β-trimethylsilyloxy - 1,3,5 (10)-estratriene were dissolved in tetrahydrofuran and the solution reacted with 5 ml. ethanol. The solution was then added under stirring to a mixture of 100 ml. liquid ammonia, tetrahydrofuran and 200 mg. sodium. During the addition of the steroid solution, a further 2.0 g. of sodium were added and the resulting deep blue colored reaction mixture stirred for about 2 hours. Thereafter, there were introduced 3 g. ammonium chloride for decolorizing the reaction solution, the ammonia carefully distilled off and the reaction mixture reacted with a little water. The tetrahydrofuran was then substantially completely distilled off whereby the reaction product was precipitated out in solid form. The solid product was separated with suction, washed with water until alkali free and dried.

Yield: 181 g. (79% of theory); M.P., 103–107° C.

On crystallization out of ether/methanol there was recovered a product having a M.P. of 111–113° C.

EXAMPLE 8

Ethylidenecyclohexane 4.5 g. 1-ethinyl-1-trimethylsilyl-oxy-cyclohexane were admixed with 40 ml. tetrahydrofuran and 6 ml. aniline. The resulting solution was introduced with stirring to a mixture of 50 ml. liquid ammonia and 0.2 g. sodium. During the addition of the solution, a further 2.0 g. of sodium were added. After the addition of the solution, the reaction mixture was stirred for some time. Thereafter the small excess of alkali metal was decomposed by the addition of a small amount of methanol and the ammonia distilled off. The remaining tetrahydrofuran solution was reacted with dilute hydrochloric acid and extracted with hexane. The hexane extract was concentrated, washed until acid free and dried over sodium sulfate. The resulting mixture was fractionated by distillation under normal pressure.

Yield: 1.89 g. ethylidenecyclohexane; $n_D19=1.4620$ (75.2% of theory).

EXAMPLE 9 dl-1-ethylidene-4,7aβ-dimethyl-5β-(p-methoxyphenyl)-3a, 4,5,6,7,7a-hexahydroindane 35 ml. ammonia were condensed and tetrahydrofuran, aniline and 40 mg. sodium added thereto. A solution of 0.8 g. dl-1α-ethinyl-4α,7aβ-dimethyl - 5β - (p - methoxyphenyl)-1β-trimethylsilyloxy-3a,4,5,6,7,7a - hexahydroindane in 20 ml. tetrahydrofuran and 0.75 ml. aniline was added to the ammonia mixture, in drop-wise fashion under stirring. During the introduction of the indane solution, an additional 200 mg. sodium in small portions were added to the reaction mixture. The dark blue colored reaction mixture was stirred for a further time and thereafter decolorized by addition of $NH_4Cl$. Following removal of the ammonia, the tetrahydrofuran solution was extensively concentrated in vacuo, the resulting residue reacted with dilute hydrochloric acid and water and the oily separated product extracted with hexane. The hexane solution was washed until acid free, dried over $Na_2SO_4$ and concentrated down to a small volume. This distillation residue was filtered through $Al_2O_3$ and the recovered filtrate further concentrated. The residue crystallized out from the concentrated filtrate at room temperature. The crystalline product was separated off with suction (560 mg.; M.P., 57–65° C.) and recrystallized out of hexane.

Yield: 500 mg.=81.5% of theory; M.P., 64–68° C.

EXAMPLE 10 dl-3-methoxy-19-nor-pregnane-1,3,5(10)17(20)-tetraene 3 g. dl - 17α - ethinyl - 3 - methoxy-17β-trimethylsilyloxy-1,3,5(10)8-estratetraene were dissolved in 45 ml. tetrahydrofuran and reacted with aniline. This solution was added under stirring to a mixture of liquid ammonia, tetrahydrofuran aniline and 100 mg. sodium. During the addition of the steroid solution, a further 1.05 g. sodium in small portions was added to the reaction mixture. The mixture was continued to be stirred, $NH_4Cl$ added and the $NH_3$ distilled off. The reaction mixture was further worked up as described in Example 1.

Yield: 2.3 g.=99% of theory; M.P., 114–120° C.

Following recrystallization out of hexane, a product melting at 124–127° C. was recovered.

EXAMPLE 11

The procedure of Example 9 was repeated using dl-17α-ethinyl - 3 - methoxy - 17β - trimethyl-silyloxy-1,3,5(10)9(11)-estratetraene as starting material. dl-3-methoxy-19-nor-pregnane-1,3,5(10)17(20)-tetraene in a yield of 97.5% and having a melting point of 120–125° C. was recovered.

EXAMPLE 12

3-ethylidene-5β-androstane-6α,17β-diol 1 g. 3α - ethinyl -3β,6α,17β-tris(trimethylsilyloxy)-5β-androstane was dissolved in 20 ml. tetrahydrofuran and reacted with aniline. This solution was added under stirring to a mixture of 30 ml. liquid ammonia and sodium. Following the complete addition of the steroid solution, the blue reaction solution was stirred for some additional time, reacted with $NH_4Cl$ and the ammonia distilled off. The further working up of the reaction mixture was carried out as described in Example 9.

Yield: 600 mg.=97.5% of theory; M.P., 126–136° C. Crystallization out of hexane resulted in a product having a melting point of 141–148° C.

EXAMPLE 13 l-3-methoxy-19-nor-pregnane-1,3,5(10)17(20)tetraene 50 ml. of a solution of 3 g. 1 mestranol-silylether tetrahydrofuran and aniline were introduced into a mixture of 75 ml. methylamine, aniline and 200 g. litium under stirring and further lithium then introduced. The reaction mixture was stirred for a further hour and then decolorized by addition of ammonium chloride. Following the distilling off of the methylamine and the tetrahydrofuran, the reaction mixture was further worked up as previously described.

Yield: 1.35 g. (I. Fraction)=58% of theory; M.P., 84–87° C. After recrystallization out of hexane, a product having a melting point of 90–92° C. was recovered.

EXAMPLE 14 d-3-methoxy-19-nor-pregnane-1,3,5(10)17(20)-tetraene 3 g. 17α - vinyl-3-methoxy-17β-trimethyl-silyloxy-1,3,5(10)-estratiene were reacted with 30 ml. liquid ammonia, 400 mg. sodium, 25 ml. tetrahydrofuran and 2 ml. aniline according to the procedure described in Example 1. 2.13 g. of reaction product were recovered (92.0% of theory) having a melting point of 84–86° C., which following recrystallization from hexane had a melting point of 90–92° C.

EXAMPLE 15 d-3-methoxy-19-nor-pregnane-2,5(10)17(20)-triene 5 g. d-17α-ethinyl-3-methoxy-17β-trimethylsilyloxy-1,3,5(10) estratriene were dissolved in 45 ml. tetrahydrofuran, reacted with isopropanol and added to a mixture of 75 ml. liquid ammonia, isopropanol and 200 mg. sodium. A further 3.0 g. sodium in small increments were then added. The reaction mixture was stirred for some time longer and decolorized by the addition of ammonium chloride. The further working up and isolation were carried out as described in Example 6. There were recovered 3.4 g. of a crude product having a melting point of 78–94° C. The further purification of the recovered product took place by dissolution in hexane, filtration over $Al_2O_3$ and crystallization.

Yield: 2.78 g.=71% of theory; M.P., 110–113° C.

EXAMPLE 16

3-methoxy-19-nor-pregnane-2,5(10)17(20)-triene

The procedure of Example 15 was repeated except that acetamide was used in place of the isopropanol. 2.49 g. of product (64% of theory) were recovered.

EXAMPLE 17

3-methoxy-19-nor-pregnane-1,3,5(10)17(20)-tetraene

The procedure of Example 1 was followed and from 5 g. 17α-ethinyl-3-methoxy-17β(2'-tetrahydropyranyloxy) 1,3,5(10-estratriene, 75 ml. ammonia, 50 ml. tetrahydrofuran, 5 ml. aniline and 1.5 g. sodium, a mixture of two reaction products was obtained. The mixture of reaction products was dissolved in hexane, filtered over $Al_2O_3$ and crystallized. There were thusly recovered 2.34 g.=62.5% of theory of ethylidene compound.

EXAMPLE 18 dl-3-methoxy-19-nor-pregnane-1,3,5(10)17(20)-tetraene 3 g. dl - 17α - ethinyl-3-methoxy-17β-trimethylsilyloxy-1,3,5(10)-estratriene and 7 g. diphenylamine were dissolved in 50 ml. tetrahydrofuran and under stirring the solution was added to a mixture of 90 ml. liquid ammonia and 100 mg. sodium. During the addition of the steroid solution a further 1.1 g. sodium in small portions were added and the resulting solution stirred for a while longer, decolorized with $NH_4Cl$ and the ammonia distilled off. Thereafter the tetrahydrofuran was extensively distilled off under vacuum and the residue reacted with dilute hydrochloric acid and water. The reaction product which precipitated out was separated off with suction, washed until acid free and dried. The recovered crude product was dissolved in hexane and after removal of the diphenylamine extracted several times with formamide and water, dried over $Na_2SO_4$ and extensively concentrated. The crystalline material thusly obtained was separated with suction, washed with a small amount of hexane and dried.

Yield: (1) Fraction 2.1 g.=90.5% of theory. (2) Fraction 80 mg.=3.5% of theory.

EXAMPLE 19

3-methylpentene (2)

17 g. 3-trimethylsilyloxy-3-methyl-pentine(1) were reacted with 170 ml. tetrahydro-furan and 20 ml. aniline. The solution thereby obtained was introduced under stirring to 350.0 ml. liquid ammonia and the resultant mixture reacted within about 30 minutes with a total of 9.5 g. sodium. Thereafter the reaction mixture is stirred for an additional hour, the excess sodium destroyed by the addition of a small amount of methanol, the ammonia distilled off, and the reaction mixture reacted with dilute HCl and extracted with ether. The ether solution was washed with water and dried over $Na_2SO_4$. The ether extract was then fractionated under normal pressure.

Yield: 6.9 g.=82% of theory of 3-methyl-pentene(2); $n_D^{20}$:0.6932.

What is claimed is:

1. Process of preparing ethylidene compounds having the structural formula

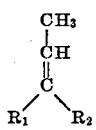

wherein $R_1$ and $R_2$ each represent a saturated lower aliphatic group and wherein $R_1$ and $R_2$ taken together can form a cyclohexyl or cyclopentyl group or wherein $R_1$ and $R_2$ can be joined together to form a condensed hydroaromatic group selected from the group consisting of perhydroindane, cyclopentano-perhydronaphthaline and cyclopentano - perhydrophenanthrene groups which comprises reacting vinyl- or ethinyl carbinol compound having the following formula

    (I)

wherein $R_1$ and $R_2$ are as above defined, $R_3$ is vinyl or ethinyl and $R_4$ is a trialkylsilyl- or tetrahydro-pyranyl group with an about stoichiometric amount of an alkali metal in the presence of a proton donor having a pKa value less than 30 and liquid ammonia.

2. Process of preparing ethylidene compounds having the structural formula

wherein R is (1) a steriod radical and the ethylidene compound has one of the following formulae

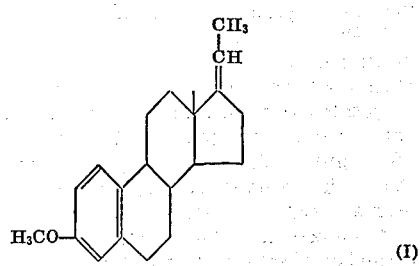    (I)

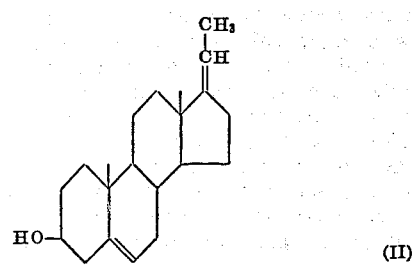    (II)

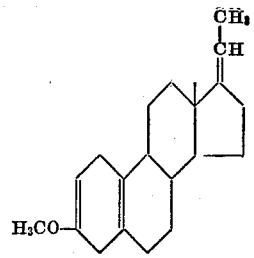    (III)

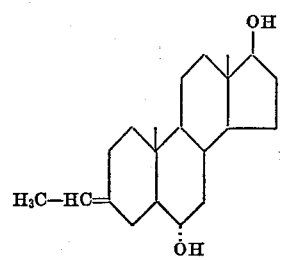    (IV)

or (2) R is cyclohexane and the ethylidene compound has the formula

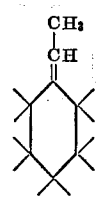    (V)

or (3) R is perhydroindane and the ethylidene compound has the formula

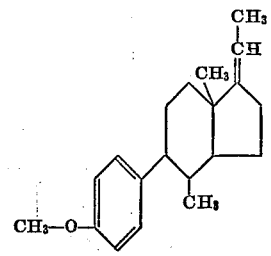    (VI)

or (4) R is butyl and the ethylidene compound has the formula

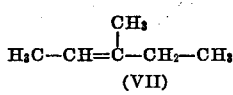
(VII)

which comprises reacting a vinyl- or ethyl-carbinol compound having the formula

wherein $R_1$ is a trimethylsilyl or tetrahydropyranyl group, R is a vinyl or ethinyl group and R is (1) a steroid radical, (2) cyclohexane, (3) perhydroindane or (4) butyl wherein the case R is a steroid, the compound having the formula

is selected from the group consisting of

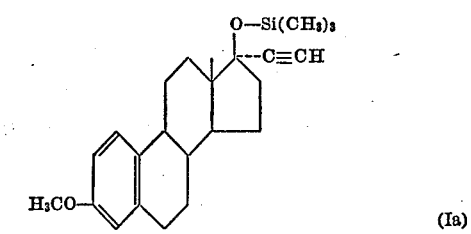    (Ia)

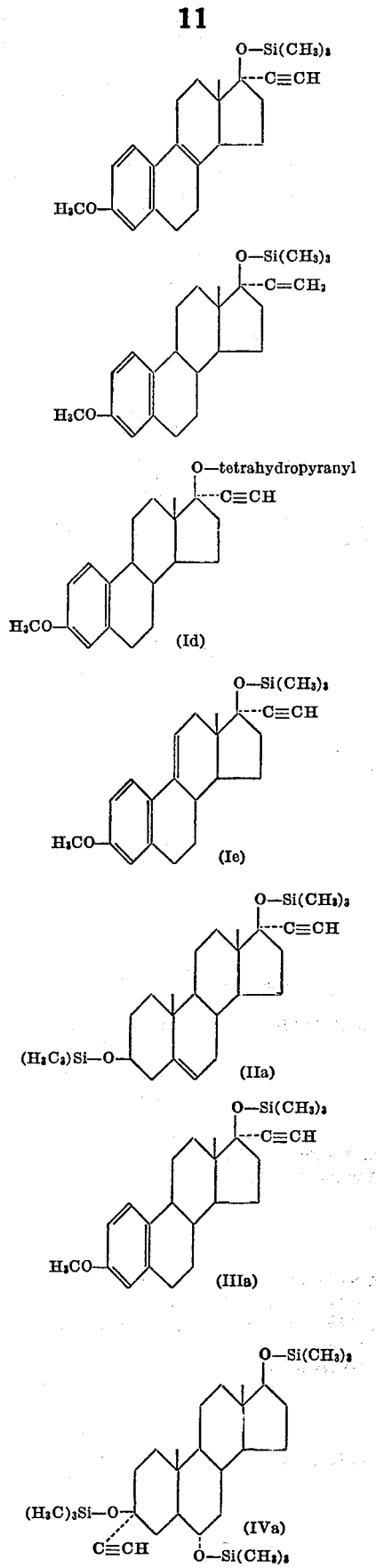

is $(H_3C)_3Si-O$   $C\equiv CH$ (Va)

wherein when R is perhydroindane, said compound $\overset{O-R_1}{\underset{R_2}{R}}$ is (Ic)

(VIa)

and
wherein when R is butyl said compound $\overset{O-R_1}{\underset{R_2}{R}}$ is $HC\equiv C-\underset{\underset{O-Si(CH_3)_3}{|}}{\overset{\overset{CH_3}{|}}{C}}-CH_2-CH_3$   (VIIa)

with an about stoichiometric amount of an alkali metal reducing agent in liquid ammonia in the presence of a proton donor selected from the group consisting of aromatic amines, alcohols and acid amides.

3. Process according to claim 1 wherein said vinyl or ethinylcarbinol compound is an ether.

4. Process according to claim 3 wherein said ether is a vinyl- or ethinyl-carbinol-trialkylsilylether or tetrahydropyranyl ether.

5. Process according to claim 3 wherein said vinyl- or ethinyl-carbinol ether contains an aromatic system in its basic structure and said reaction is conducted in the presence of a proton donor having a pKa value >22, to form ethylidene compounds in which the aromatic system of the starting product is retained.

6. Process according to claim 3 wherein said vinyl- or ethinyl-carbinol trialkylsilylether or tetrahydropyranyl ether contains a double bond in its molecule which is conjugated with an aromatic system and said reaction is conducted in the presence of a proton donor having a pKa value >22, to form ethylidene compounds in which the double bond of starting product is reduced, but the aromatic system is retained.

7. Process according to claim 3 wherein said vinyl- or ethinyl-carbinol silylether or tetrahydropyranyl ether contains an aromatic system or a double bond in conjugation with an aromatic system in its molecule and said reaction is conducted in the presence of a proton donor having a pKa value >22 and thereafter said reaction is conducted in the presence of a stronger proton donor having a pKa value <23, to form ethylidene compounds in which the aromatic system or the conjugated system consisting of an aromatic system and a double bond is also reduced.

8. Process according to claim 3 wherein said vinyl- or ethinyl-carbinol silylether or tetrahydropyranyl ether contains an aromatic system or a double bond in conjugation with an aromatic system in its molecule and said reaction is conducted in the presence of a proton donor having a pKa value>22 and thereafter said reaction is conducted in the presence of a stronger proton donor having a pKa value <23, to form ethylidene compounds in which the aromatic system or the conjugated system consisting of an aromatic system and a double bond is also reduced.

9. Process according to claim 1 wherein said reaction is conducted in the presence of a solvent.

10. Process according to claim 1 wherein said alkali metal is sodium, potassium or lithium.

11. Process according to claim 1 wherein said proton donor is aniline, diphenylamine, alcohol, or acetamide.

No references cited.

U.S. Cl. X.R.

260—612, 666, 677